Oct. 18, 1960     V. E. BECKSTED     2,956,656
ADJUSTABLE ROLLING FRICTION TORQUE CLUTCH

Filed Jan. 11, 1956     3 Sheets-Sheet 1

INVENTOR.
VERNON E. BECKSTED
BY
Bates, Teare & McBeau
ATTORNEYS

INVENTOR.
VERNON E. BECKSTED
BY
Bates, Teare + McBean
ATTORNEYS

Oct. 18, 1960   V. E. BECKSTED   2,956,656
ADJUSTABLE ROLLING FRICTION TORQUE CLUTCH
Filed Jan. 11, 1956   3 Sheets-Sheet 3

INVENTOR.
VERNON E. BECKSTED
BY
Bates, Teare + McBeau
ATTORNEYS

United States Patent Office 2,956,656
Patented Oct. 18, 1960

2,956,656

ADJUSTABLE ROLLING FRICTION TORQUE CLUTCH

Vernon E. Becksted, 42 Lee Court, Bedford, Ohio

Filed Jan. 11, 1956, Ser. No. 558,440

3 Claims. (Cl. 192—74)

This invention relates generally to an arrangement for controlling the transmission of torque from a drive shaft to a driven shaft and also relates to an arrangement for adjustably varying the frictional contact in a rolling friction torque clutch.

The transmission of torque from a drive to a driven shaft may be continuous through a fixed coupling or may be discontinuous by utilizing a coupling which may be selectively engaged or disengaged to start or stop the driven member. The latter type of coupling is more commonly referred to as a torque clutch and this invention is particularly directed to the type of clutch which transmits torque from a driving to a driven member by rolling frictional contact.

A torque clutch which operates by rolling frictional contact to start a driving load gradually without shock utilizes a driving and a driven friction member which are selectively urged into rolling frictional contact to transmit the turning torque from the driving to the driven member. However, the torque transmitted through a rolling frictional contact coupling varies inversely with the driven load and it is also a principal object of this invention to provide an arrangement for varying the frictional contact to control the torque transmitted through the rolling frictional contact from a driving member to a driven load.

Another object of this invention is to provide an arrangement which can be automatically controlled to adjust the torque transmitted through rolling frictional contact between a driving member and a driven load to compensate for variations in the driven load in response to such variations.

Briefly, the foregoing and other objectives which will become more apparent in connection with the following description are accomplished by providing a driven member having a continuous resilient friction surface and a driving member having a relatively movable roller surface in contact with the driven friction surface together with an arrangement for adjustably varying the frictional contact between the driving and driven friction surfaces. In one embodiment of the invention, the resilient friction surface of the driven member is a solid homogeneous member and the adjustment of frictional contact is accomplished by mechanically positioning the driving rolling friction surface. Another embodiment of the invention contemplates that the driven resilient friction surface is in the form of a pneumatic member and frictional contact between the driven and driving rolling friction surfaces is controlled by varying the pneumatic pressure within the driven pneumatic member.

Figure 1:
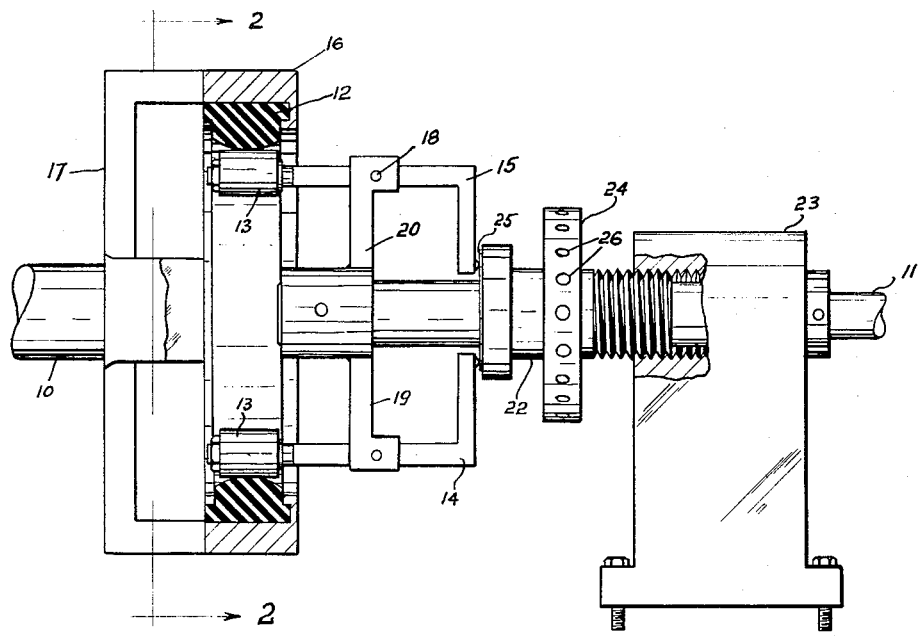
Fig. 1 is a side elevation in partial section of a drive and driven shaft interconnected by the adjustable rolling friction torque clutch of this invention.
Figure 2:
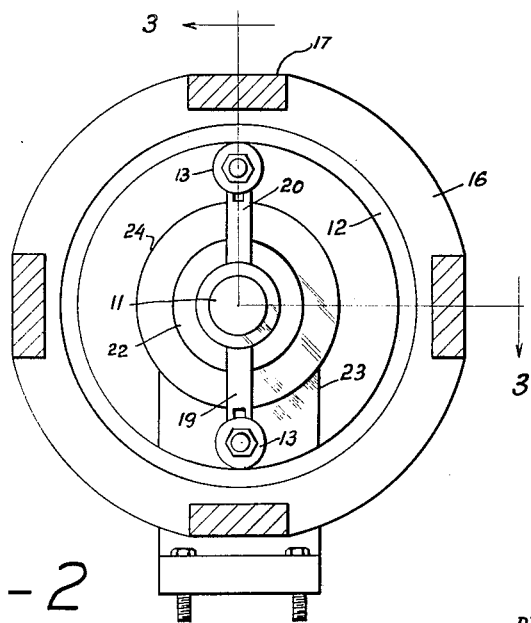
Fig. 2 is a view taken along the lines 2—2 in Fig. 1.

Referring now more particularly to Figs. 1 and 2 of the drawings, there is shown a drive shaft 11 which is intended to be coupled to a source of rotating power, not forming part of this invention and therefore not shown, and a driven shaft 10 which is adapted to be coupled to a suitable load. The coupling between the drive shaft 11 and the driven shaft 10 is accomplished in accordance with this invention through an adjustable rolling friction contact embodying an annular resilient friction member 12 which constitutes one friction surface and a plurality of circumferentially spaced rollers 13 mounted on movable supporting arms 14 and 15 carried by the driving shaft 11 and each member 13 constituting the other relatively movable rolling friction surfaces.

The annular friction surface formed by the resilient member 12 is preferably made of rubber or any suitable resilient material having considerable liveliness and elasticity and is shown supported in a rigid annular backing ring 16 which is carried by a spider 17 on the driven shaft 10. In the embodiment shown in Figs. 1 and 2 of the drawings, the supporting arms 14 and 15 are pivoted on transverse pins 18 extending through the extremities of radially extending arms 19 and 20 which are keyed on the driving shaft 11. Thus, the rolling friction members 13 may be moved substantially radially relative to the axis of the shaft and normal to the inner periphery of the resilient friction member 12. It is readily apparent that the frictional contact between the members 13 and the inner periphery of the resilient member 12 can be varied by pivoting the supporting arms 14 and 15 to adjust the turning torque transmitted from the drive to the driven shaft.

In the preferred form of the invention shown in Figs. 1 and 2 of the drawings, the supporting arms 14 and 15 have inwardly directed extremities opposite the members 13 and are pivoted by axially positioning an abutment in the form of a sleeve 22 against these extremities. The sleeve 22 encircles the drive shaft and is threaded into a supporting stanchion 23 and serves the additional purpose of providing a bearing for the shaft 11. An enlarged ring portion 24 on the sleeve 22 is provided with thrust bearing 25 for the arms 14 and 15 and with a plurality of circumferentially spaced and radially extending apertures 26 adapted to receive a tool which can be used to rotate the sleeve 22 inwardly or outwardly in the stanchion 23. This is shown in greater detail in the sectional view of Fig. 3 where the ring 24 is shown welded on the sleeve 22 and where the stanchion is shown as supporting thrust bearings 27 against which a shoulder 28 on the drive shaft 11 bears during rotation.

Figure 4:
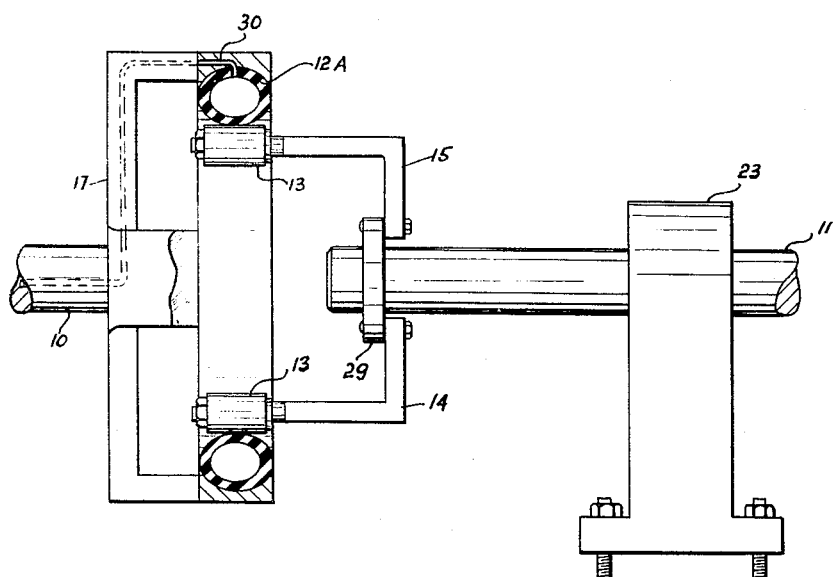
Fig. 4 is a side elevation in partial section similar to Fig. 1 illustrating another embodiment of the adjustable rolling friction torque clutch of this invention.

Referring now to Fig. 4 of the drawings, there is shown a different embodiment of the invention wherein the resilient friction surface 12 takes the form of a tubular pneumatic member 12A adapted to be inflated with pneumatic pressure to provide a resilient friction surface against which the rolling friction members 13 carried by the drive shaft 11 may bear. In this embodiment, the supporting arms 14 and 15 are fixed to a ring 29 keyed on the drive shaft 11 and occupy the same radial position relative to the shaft axis at all times. The adjustment of the rolling frictional contact between the members 13 and the resilient friction surface 12A is accomplished by controlling the pneumatic pressure within the tubular member 12A. The pneumatic member has a conduit connection 30 which preferably extends outwardly along the shaft 10 where it may be connected to a suitable source of pneumatic pressure.

Figure 3:
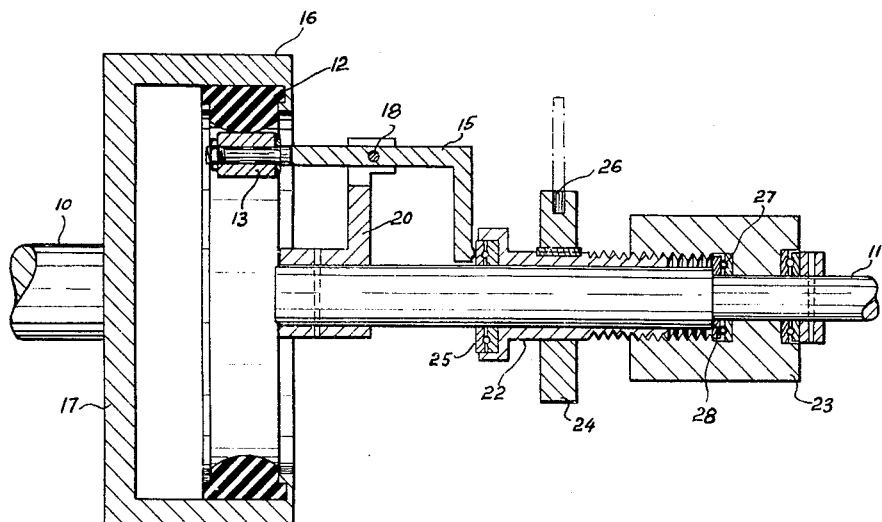
Fig. 3 is a sectional view taken along the lines 3—3 in Fig. 2 of the drawings.

In the case of either embodiment, it is readily apparent that the frictional contact may be varied automatically in response to variation in load on the driven shaft 10 by providing any convenitonal means for translating the load into a control force which, in the case of the embodiment shown in Figs. 1 through 3 of the drawings, would operate against the arms 14 and 15 to adjust the sleeve 22 axially and, in the case of the embodiment shown in Fig. 4 of the drawings, would operate to adjust the pressure in the pneumatic member 12A, each in a direction and in an amount to compensate for the variation in load. It is also apparent that the members 13 may be made of either substantially rigid or resilient material for adjustable operation in conjunction with a driven friction surface.

Figure 5:
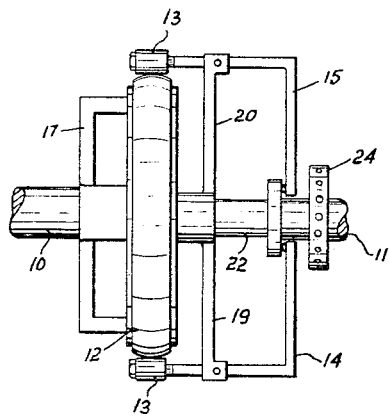
Figs. 5, 6, 7 and 8 illustrate modified forms of the several embodiments of the adjustable rolling friction torque clutch arrangement interconnecting a drive and a driven shaft.
Figure 6:
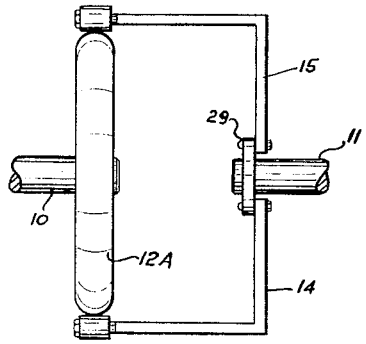
Figure 7:
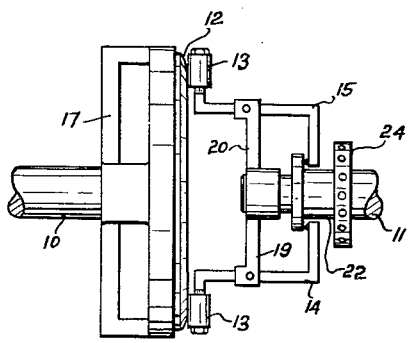
Figure 8:
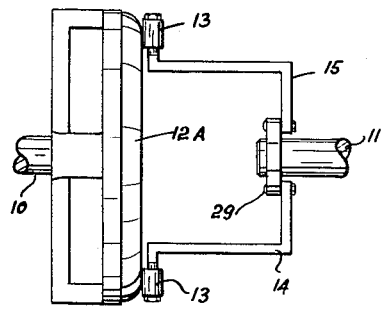

Referring now to Figs. 5 through 8 of the drawings, there are shown various modifications of the main embodiments of the invention which in the case of Figs. 5 and 6 have the resilient friction surface 12 on the external periphery of a rigid supporting ring with rolling members 13 engaging such external periphery while, in the form of Figs. 7 and 8, the resilient friction surface 12 is carried on a side face of an annular ring and the rolling members 13 engage the plane of such resilient surface with a force parallel to the axis of the shafts. Any form of the basic arrangement shown in the preferred embodiments may be used provided that at least one of the friction surfaces is resilient while the other is movable to pemit adjustment of the rolling frictional contact between the friction surfaces in a manner that will control the transmission of turning torque from the drive 11 to the driven shaft 10.

I have shown and described what I consider to be the preferred embodiments of my invention along with modified forms and suggestions, and it will be obvious to those skilled in the art that other changes and modifications may be made without departing from the scope of my invention as described by the appended claims.

I claim:

1. In an adjustable rolling friction torque clutch having a driving and a driven shaft one of which carries an annular resiliently compressible friction surface and other of which carries a plurality of circumferentially spaced rolling friction members adjacent said annular friction surface, means for adjustable positioning said circumferentially spaced rolling friction members towards and away from frictional engagement with said annular friction surface, said means including radially extending members carried by the corresponding shaft in circumferentially spaced relation, a lever arm pivotally supported intermediate its ends on each radially extending member and each lever arm carrying a rolling friction member at one end adjacent the annular friction surface, a sleeve freely journaled on said corresponding shaft and movable axially thereon, the other end of each lever arm being turned inwardly towards the shaft and positioned adjacent one end of said sleeve and adapted to be engaged thereby to tilt the lever arms about their respective pivotal supports, and means for selectively moving said sleeve axially in either direction to position said one end of each lever arm and its rolling friction member towards or away from frictional engagement with said annular friction surface.

2. In an adjustable rolling friction torque clutch in accordance with claim 1 wherein said rolling friction members are evenly spaced with respect to one another in a circumferential direction about the axis of rotation of said shafts.

3. In an adjustable rolling friction torque clutch having a driving member and a driven member operatively supported for rotation adjacent each other, one of said members carrying an annular resiliently compressible friction surface, the other of said members comprising a rolling friction element having a friction surface for rolling frictional engagement with said first mentioned surface upon rotation of said driving member, means for adjustably positioning said second mentioned surface toward and away from frictional engagement with said first mentioned surface, said means including a radially extending element carried by said other member, a lever arm pivotally supported intermediate its ends on said radially extending element and carrying said rolling element at one end adjacent said first mentioned surface, a sleeve freely journaled on said other member and movable axially thereon, the other end of said lever arm being turned inwardly toward said sleeve, means on said sleeve engageable with said inwardly turned end of said lever arm to tilt said lever arm about its pivotal support, and means for selectively moving said sleeve axially in either direction to position said one end of said lever arm and associated rolling element toward or away from rolling frictional engagement with said first mentioned surface thereby selectively adjusting the contact pressure between said frictional surfaces.

References Cited in the file of this patent

UNITED STATES PATENTS

| 468,682 | McLaughlin | Feb. 9, 1892 |
| 519,899 | Babcock | May 15, 1894 |
| 1,147,620 | Dobbins | July 20, 1915 |
| 1,631,470 | Chase | June 7, 1927 |
| 2,092,632 | Bedford | Sept. 7, 1937 |
| 2,197,522 | Ferguson et al. | Apr. 16, 1940 |
| 2,706,388 | Potgieter | Apr. 19, 1955 |
| 2,757,768 | Landerer | Aug. 7, 1956 |

FOREIGN PATENTS

| 286,930 | Germany | Oct. 28, 1913 |